United States Patent
Ohashi

(10) Patent No.: US 9,148,214 B2
(45) Date of Patent: Sep. 29, 2015

(54) APPARATUS AND METHOD FOR PROVIDING A RELAYED WIRELESS COMMUNICATION PATH BETWEEN CELLS

(71) Applicant: FUJITSU LIMITED, Kawasaki-shi, Kanagawa (JP)

(72) Inventor: Takashi Ohashi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 173 days.

(21) Appl. No.: 13/957,525

(22) Filed: Aug. 2, 2013

(65) Prior Publication Data
US 2014/0065951 A1 Mar. 6, 2014

(30) Foreign Application Priority Data
Sep. 5, 2012 (JP) .................................. 2012-195561

(51) Int. Cl.
H04W 88/08 (2009.01)
H04B 7/155 (2006.01)

(52) U.S. Cl.
CPC ............. *H04B 7/1555* (2013.01); *H04W 88/08* (2013.01)

(58) Field of Classification Search
CPC ............................. H04B 7/1555; H04W 88/08
USPC ............. 455/562.1, 561, 66.1, 7, 20, 21, 509, 455/452.1, 524, 67.11, 277.1, 67.16
See application file for complete search history.

(56) References Cited

U.S. PATENT DOCUMENTS

| | | | |
|---|---|---|---|
| 2003/0124976 A1* | 7/2003 | Tamaki et al. | 455/15 |
| 2007/0021151 A1 | 1/2007 | Mori et al. | |
| 2009/0097584 A1* | 4/2009 | Takai et al. | 375/267 |
| 2010/0222051 A1* | 9/2010 | Watanabe et al. | 455/422.1 |
| 2011/0038284 A1 | 2/2011 | Senarath et al. | |
| 2013/0072184 A1 | 3/2013 | Kusano et al. | |

FOREIGN PATENT DOCUMENTS

| | | |
|---|---|---|
| JP | 2000-50359 A | 2/2000 |
| JP | 2007-36487 A | 2/2007 |
| JP | 2010-114904 A | 5/2010 |
| JP | 2011-101328 A | 5/2011 |
| JP | 2011-519530 A | 7/2011 |
| JP | 2011-250216 A | 12/2011 |

* cited by examiner

*Primary Examiner* — John J Lee
(74) *Attorney, Agent, or Firm* — Arent Fox LLP

(57) ABSTRACT

A first apparatus at a first base station changes directivity of a first antenna connected in a direction of a cell of a second base station adjacent to the first base station, where directivity of some antennas of a second apparatus at the second base station is changed to a cell of the first base station and some radio resources are assigned to wireless communication with the first apparatus. The first apparatus receives a signal of a first frequency from the second apparatus via the first antenna, converts the received signal into a signal of a second frequency, demodulates the signal of the second frequency, corrects a delay of the demodulated signal caused by propagation of a radio wave and frequency conversion, and modulates the corrected signal to a signal of a third frequency which is transmitted to a cell of the first base station via a second antenna.

11 Claims, 13 Drawing Sheets

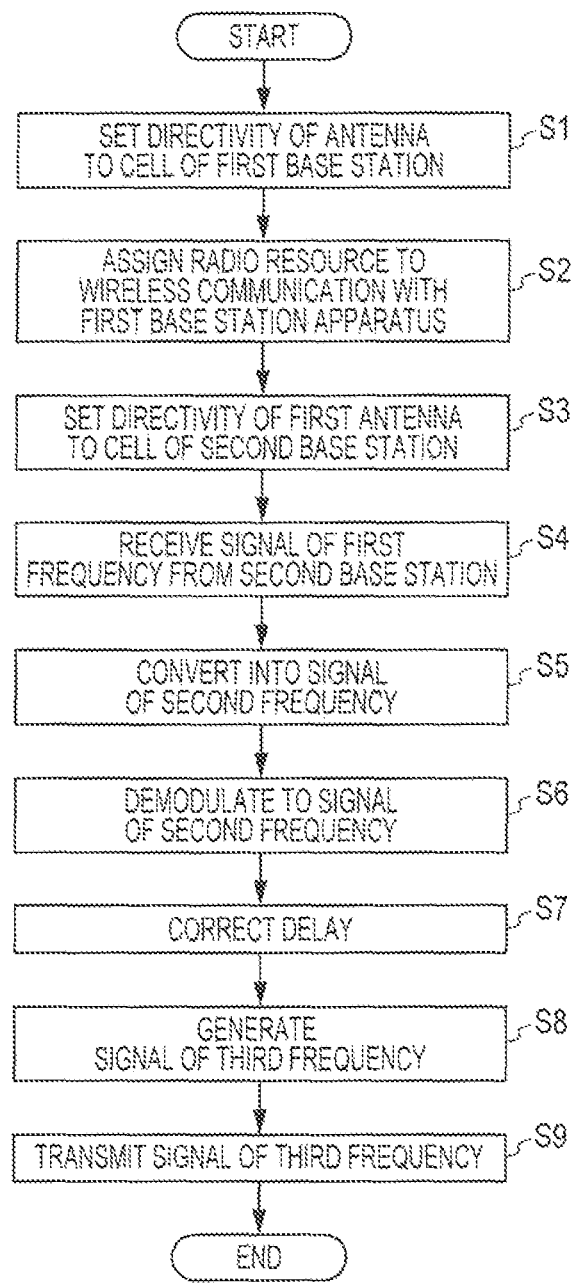

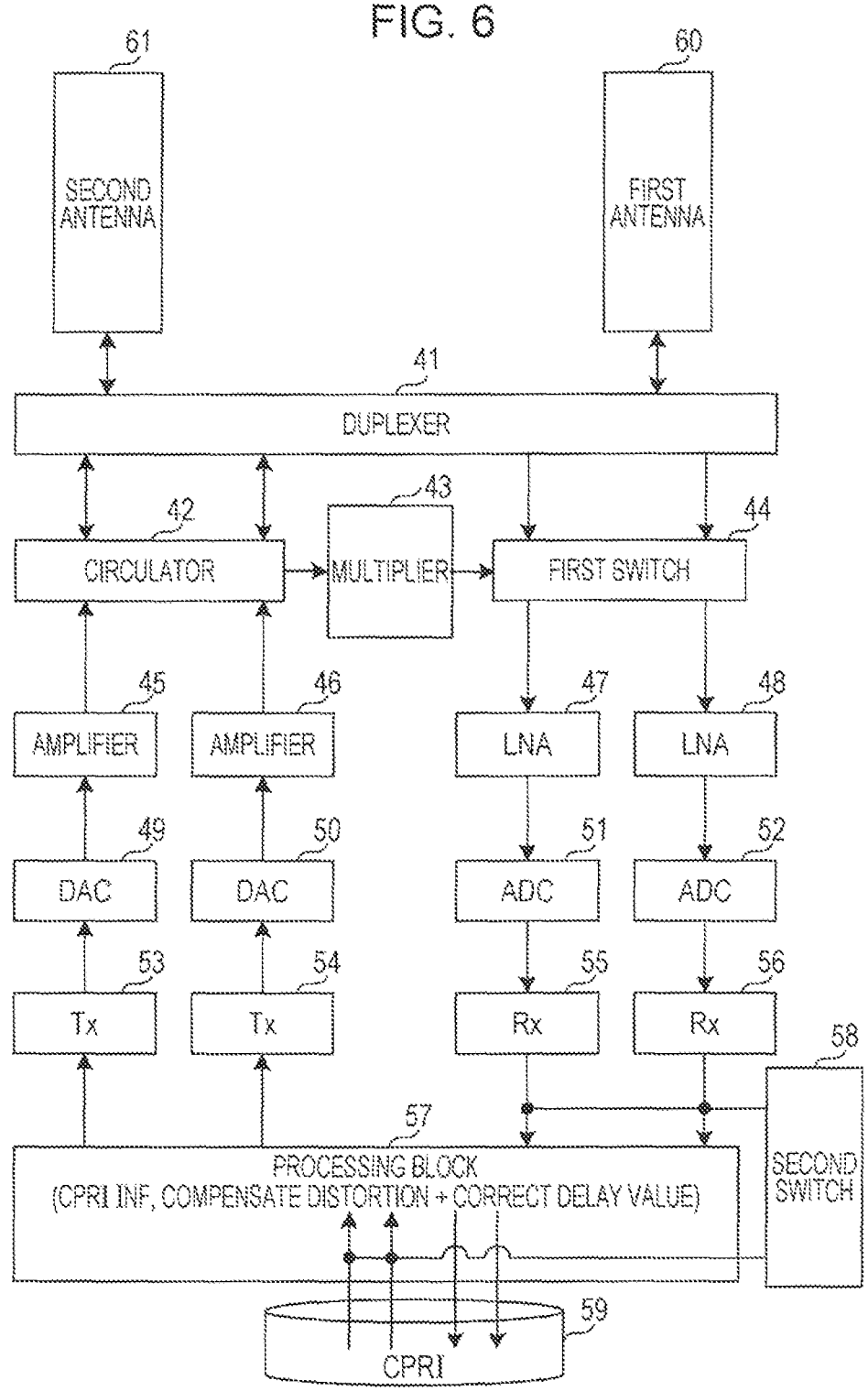

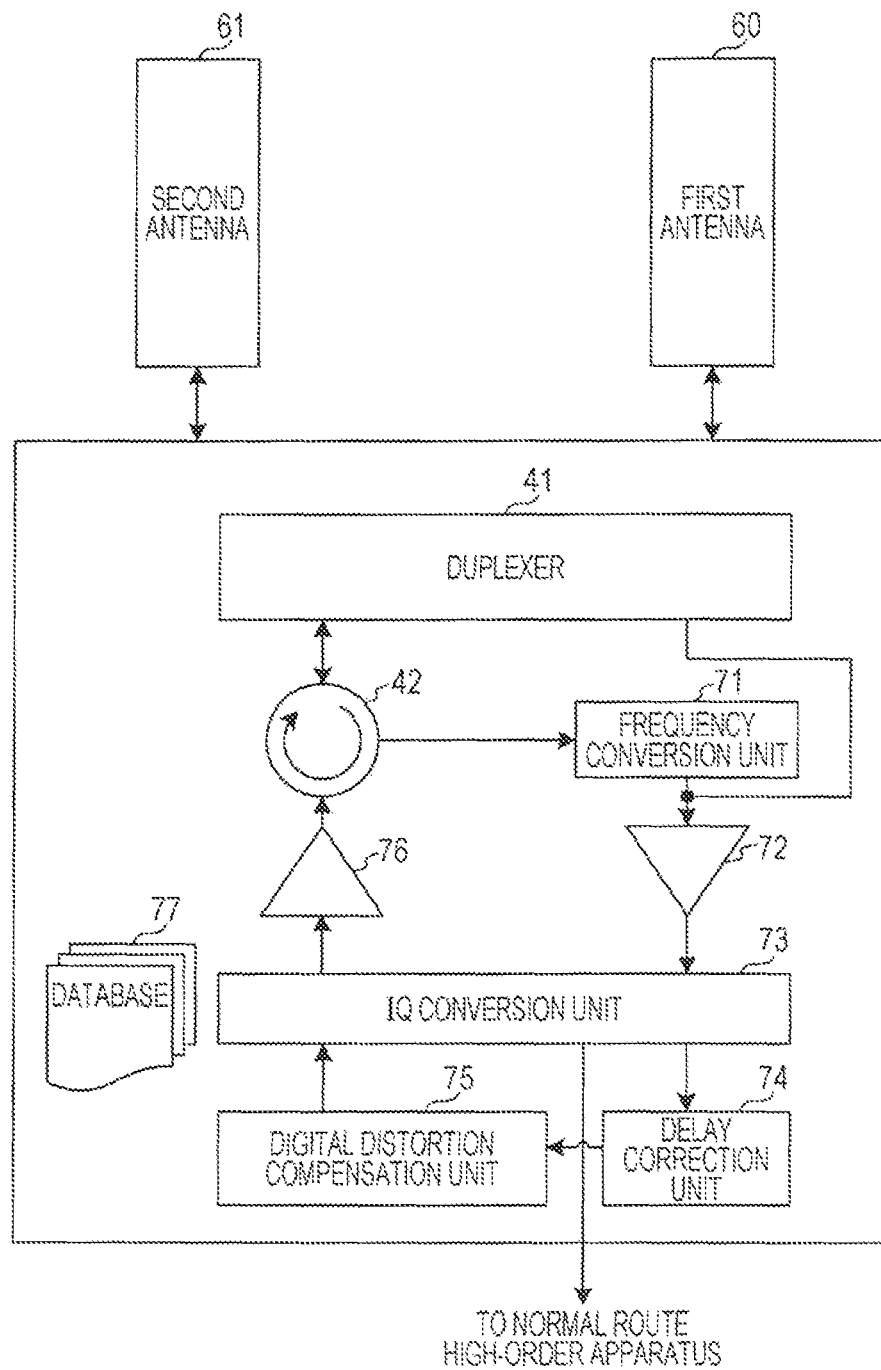

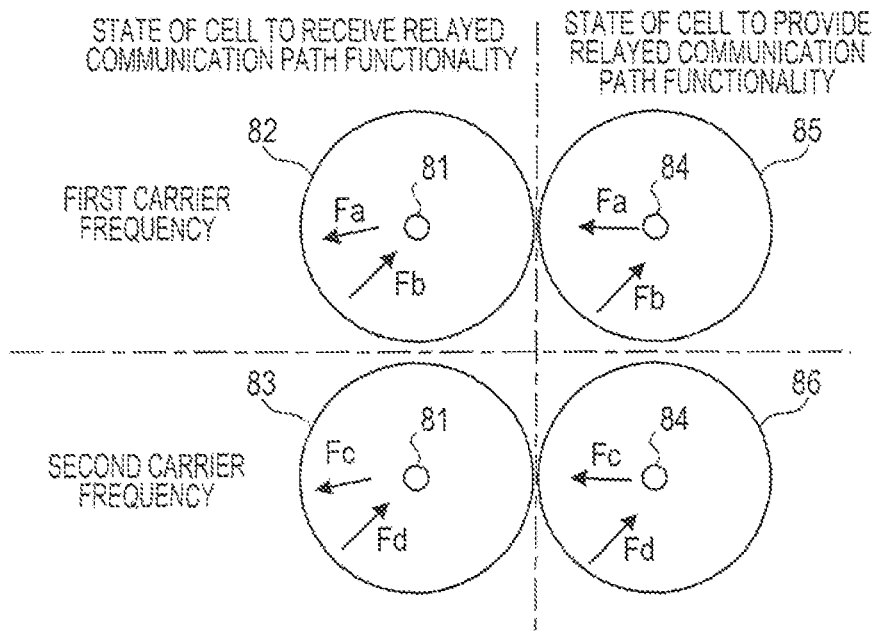
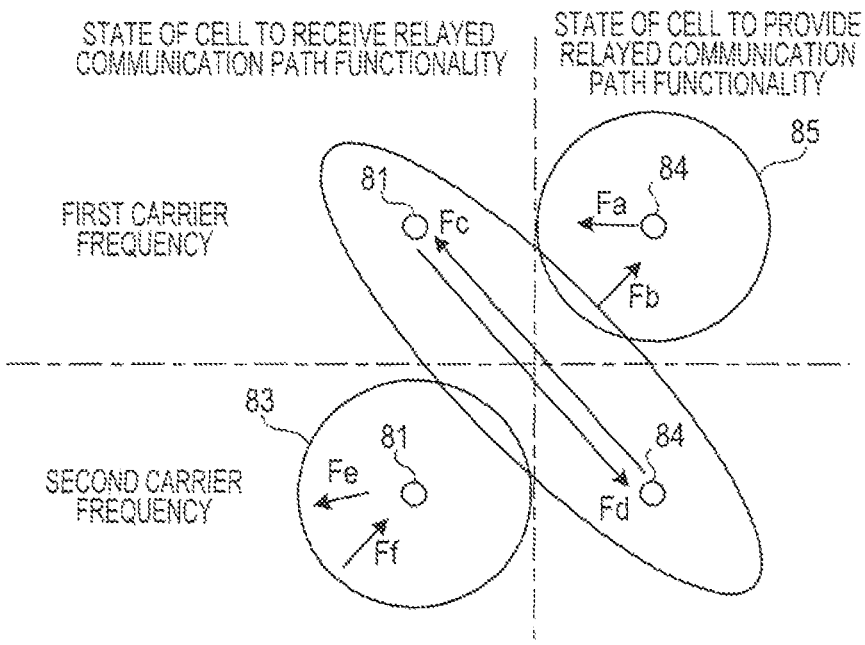

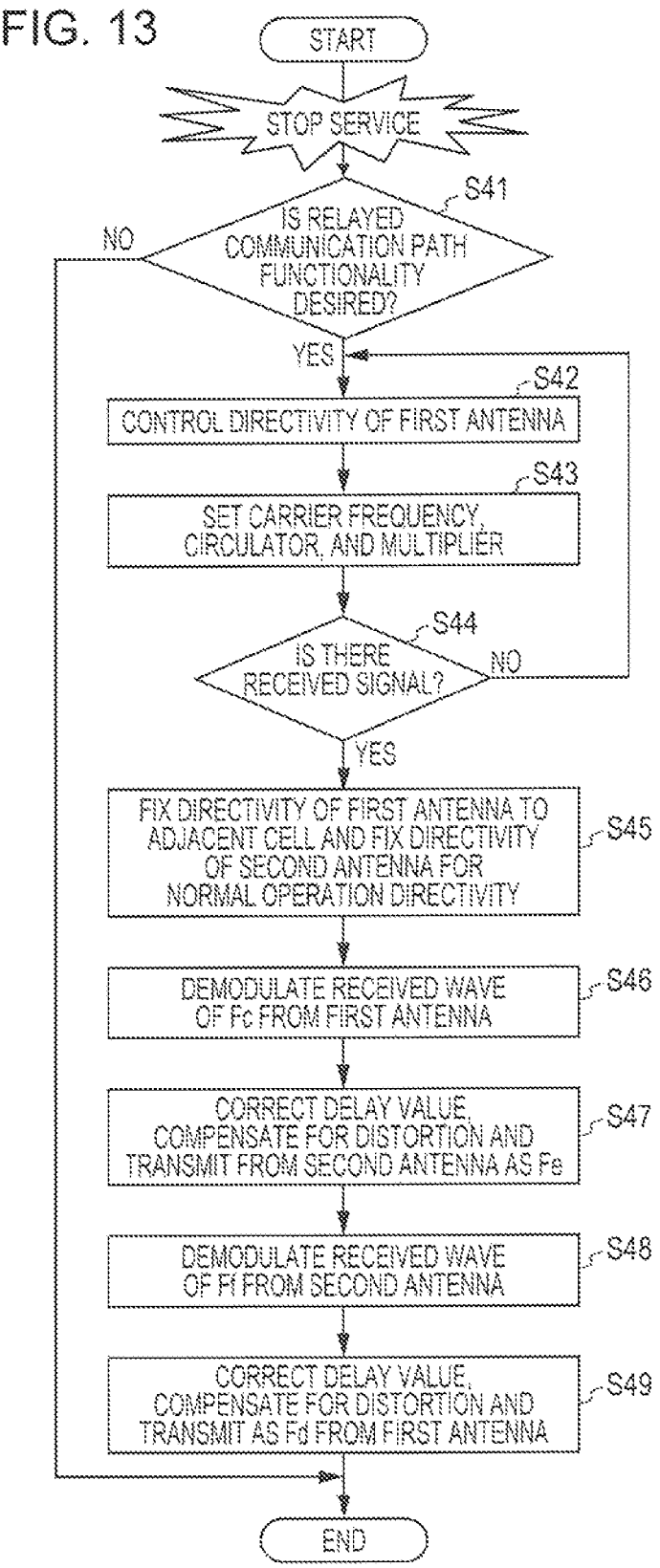

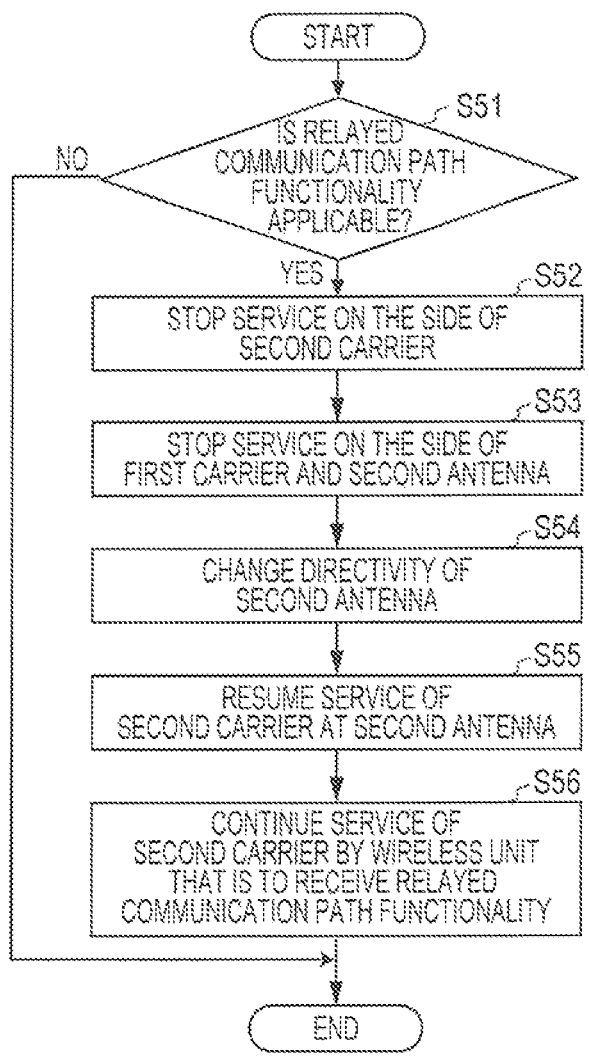

APPARATUS AND METHOD FOR PROVIDING A RELAYED WIRELESS COMMUNICATION PATH BETWEEN CELLS

CROSS-REFERENCE TO RELATED APPLICATION

This application is based upon and claims the benefit of priority from the prior Japanese Patent Application No. 2012-195561, filed on Sep. 5, 2012, the entire contents of which are incorporated herein by reference.

FIELD

The present embodiments relate to apparatus and method for providing a relayed wireless communication path between cells.

BACKGROUND

In related art, there is a known technique of transferring an outgoing call from a base station that received the outgoing call generated at a mobile telephone to another base station that can be connected to a base station control device (for example, refer to Japanese Laid-open Patent Publication No. 2000-50359, the entire contents of which are incorporated by reference herein). There is also a known technique that one base station can reestablish communication through a second base station via a relay station connected to the second base station when the first base station is disconnected from the network (for example, refer to Japanese National Publication of International Patent Application No. 2011-519530, the entire contents of which are incorporated by reference herein). There is also a known technique of radiating radio waves further than a normal radio wave radiation range by changing the tilt angle of an antenna of a base station (for example, refer to Japanese Laid open Patent Publication No. 2011-101328, the entire contents of which are incorporated by reference herein).

There is also a known technique of regulating a coverage of an antenna by adjusting a tilt angle of the antenna of a base station of a handover source (for example, refer to Japanese Laid-open Patent Publication No. 2011-250216, the entire contents of which are incorporated by reference herein). There is also a known technique of transmitting data from one radio terminal to another radio terminal by conducting communication between base stations (for example, refer to Japanese Laid-open Patent Publication No. 2010-114904, the entire contents of which are incorporated by reference herein). There is also a known technique of adjusting the tilt angle of an antenna of a base station when a state in a service area changes due to installation or removal of another base station (for example, refer to Japanese Laid-open Patent Publication No. 2007-36487).

SUMMARY

According to an aspect of the invention, a first apparatus at a first base station changes directivity of a first antenna connected to the first apparatus toward a cell of a second base station adjacent to the first base station, where a second apparatus at the second base station changes directivity of some of a plurality of antennas of the second apparatus to a cell of the first base station, and assigns a part of its radio resources to wireless communication with the first apparatus. The first apparatus receives a signal of a first frequency from the second apparatus via the first antenna, converts the received signal of the first frequency into a signal of a second frequency, demodulates the signal of the second frequency, and corrects a delay in the modulated signal that is caused by propagation of a radio wave from the second base station to the first base station and by a process of frequency conversion. The first apparatus modulates the corrected signal to a signal of a third frequency, and transmits the signal of the third frequency toward a cell of the first base station from a second antenna connected to the first apparatus.

Various aspects of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates an example of a wireless communication method according to an embodiment;

FIG. 6 illustrates a hardware configuration of another example of a base station apparatus provided in a base station according to an embodiment;

FIG. 7 illustrates a functional configuration of another example of a base station apparatus provided in a base station according to an embodiment;

FIG. 8 illustrates another example of a normal operating state of a wireless communication system according to an embodiment;

FIG. 9 illustrates another example of a relayed communication path state when service is discontinued in a wireless communication system according to an embodiment;

FIG. 13 illustrates an example of an operation of radio equipment that is to receive relayed communication path functionality from an adjacent base station in a wireless communication system according to an embodiment; and FIG. 14 illustrates an example of an operation of radio equipment that is to provide relayed communication path functionality to a cell of an adjacent base station in a wireless communication system according to an embodiment.

DESCRIPTION OF EMBODIMENTS

Figure 1:
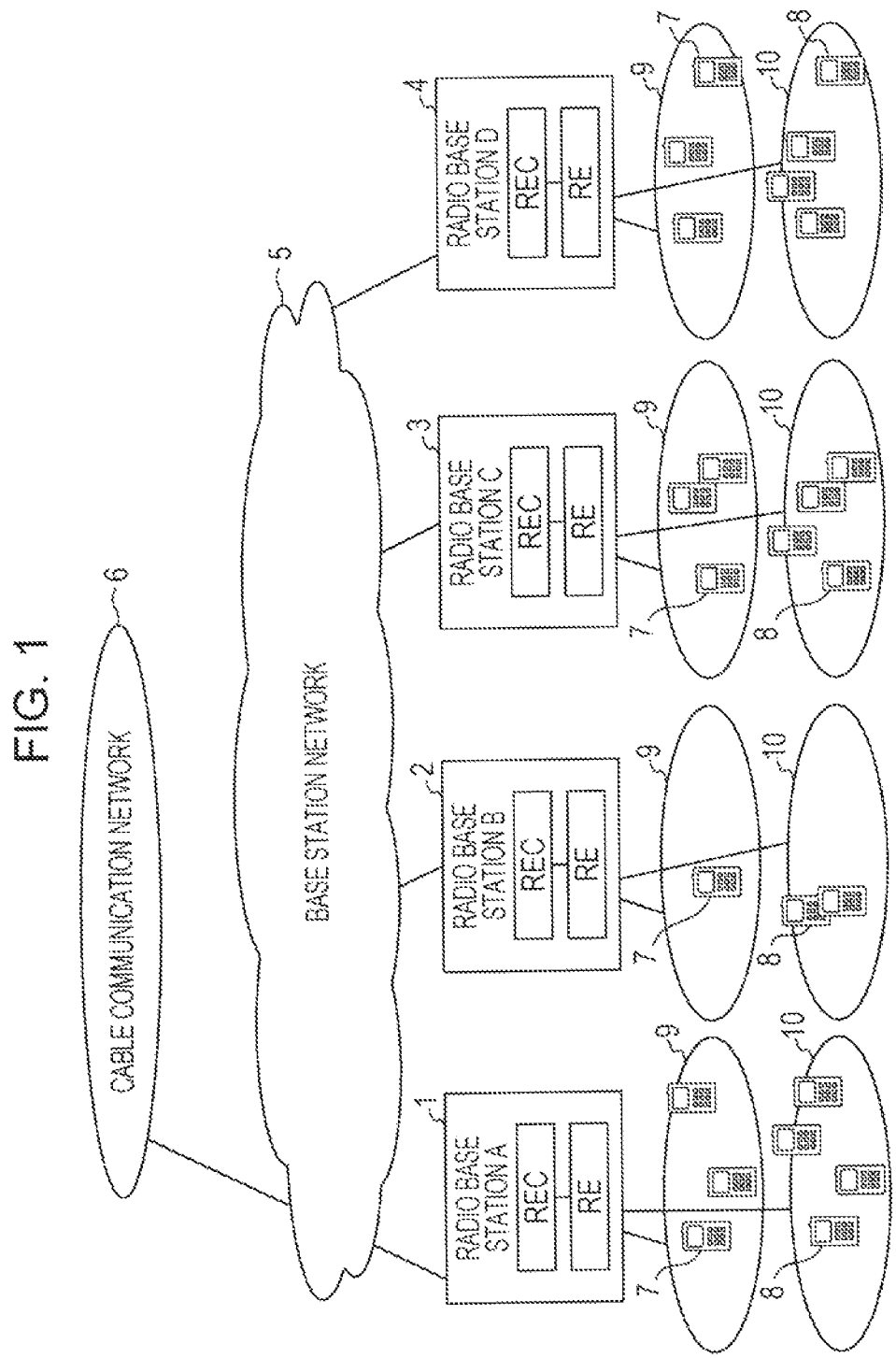
FIG. 1 illustrates an example of a normal operating state of a wireless communication system according to an embodiment.

When any defect is caused in the radio equipment controller which controls the radio equipment at the base station, data transfer between base stations may be affected or synchronization between base stations via a relay station may be lost, for example. Therefore, there is a problem that a cell at a base station to which service has been discontinued due to a defect of the radio equipment controller or a disconnect from a higher-order station may not receive relayed communication path functionality from an adjacent base station.

Even if the tilt angle of the antenna of the base station that is to provide relayed communication path functionality may be controlled so that a radio wave reaches the cell of the base station that is to receive relayed communication path functionality, a range in which wireless connection is possible may be determined depending on the transmission capacity of the radio equipment of the base station that is to provide relayed communication path functionality and on the transmission capacity of a terminal which carries out wireless connection with the base station that is to provide relayed communication path functionality. Therefore, there is a problem that at least a part of the cell of the base station which has discontinued the service may not receive relayed communication path functionality.

With reference to the accompanying drawings, preferred embodiments of a base station, a wireless communication system, and a wireless communication method will be described in detail. In the following description of the embodiments, the same component is denoted by the same reference numeral and duplicated description is omitted.

Example of Wireless Communication System

FIG. 1 illustrates an example of a normal operating state of a wireless communication system according to an embodiment. As illustrated in FIG. 1a radio base station A1, a radio base station B2, a radio base station C3, and a radio base station D4 may be, for example, connected to a base station network 5. The number of the radio base stations connected to the base station network 5 may be any number, such as two or three, or five or more. The base station network 5 may be connected to a cable communication network 6. In the following description, the radio base station may be referred to interchangeably as a base station.

In a normal operating state, each of the radio base stations 1 to 4 (A1, B2, C3, and D4) may carry out wireless communication with mobile terminals 7 and 8 located within cells of each of the radio base stations 1 to 4 using, for example, carrier waves of two carrier frequencies. In FIG. 1, regarding each of the radio base stations 1 to 4, the mobile terminals 7 which carry out wireless communication using a carrier wave of a first carrier frequency are located within a cell 9, and the mobile terminals 8 which carry out wireless communication using a carrier wave of a second carrier frequency are located within a cell 10. The cells 9 and 10 overlap each other and, therefore, comprise substantially the same cell. The number of the carrier frequencies of each of the radio base stations 1 to 4 may be multiple, such as one, or three or more. A base station apparatus is provided at each of the radio base stations 1 to 4.

Example of Base Station Apparatus

Figure 2:
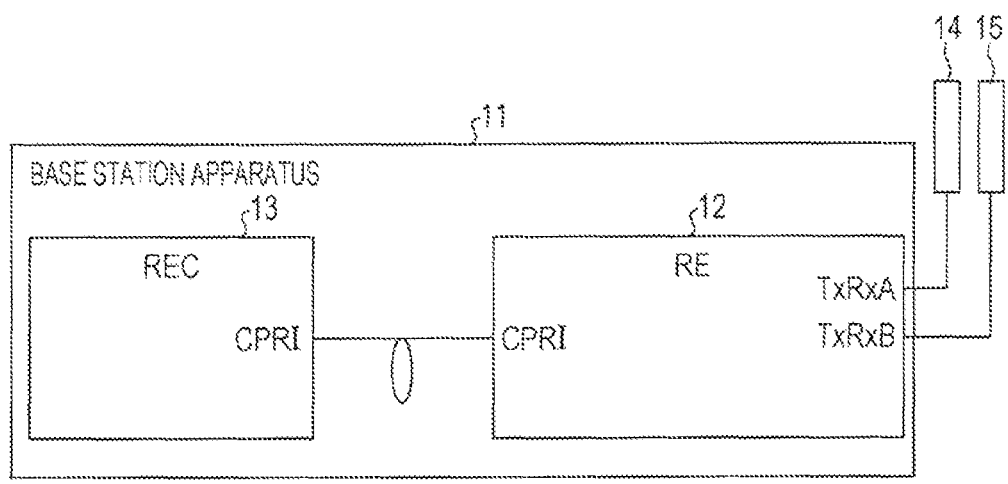
FIG. 2 illustrates an example of a base station apparatus provided in a base station according to an embodiment.

FIG. 2 illustrates an example of a base station apparatus provided at a base station according to an embodiment. As illustrated in FIG. 2, a base station apparatus 11 includes radio equipment (RE) 12 which carries out wireless communication with the mobile terminal, and a radio equipment controller (REC) 13 which controls the radio equipment 12. The radio equipment 12 and the radio equipment controller 13 may be connected to each other by, for example, an interface which meets the common public radio interface (CPRI) specification.

The radio equipment 12 may include, for example, two pairs of transmitters (Tx) and receivers (Rx). In FIG. 2, one of the pairs of transmitter and receiver is denoted by TxRxA and the other pair of transmitter and receiver is denoted by TxRxB. An antenna 14 may be connected to TxRxA and an antenna 15 may be connected to TxRxB.

Example of a Relayed Communication Path State when Service is Discontinued

Figure 3:
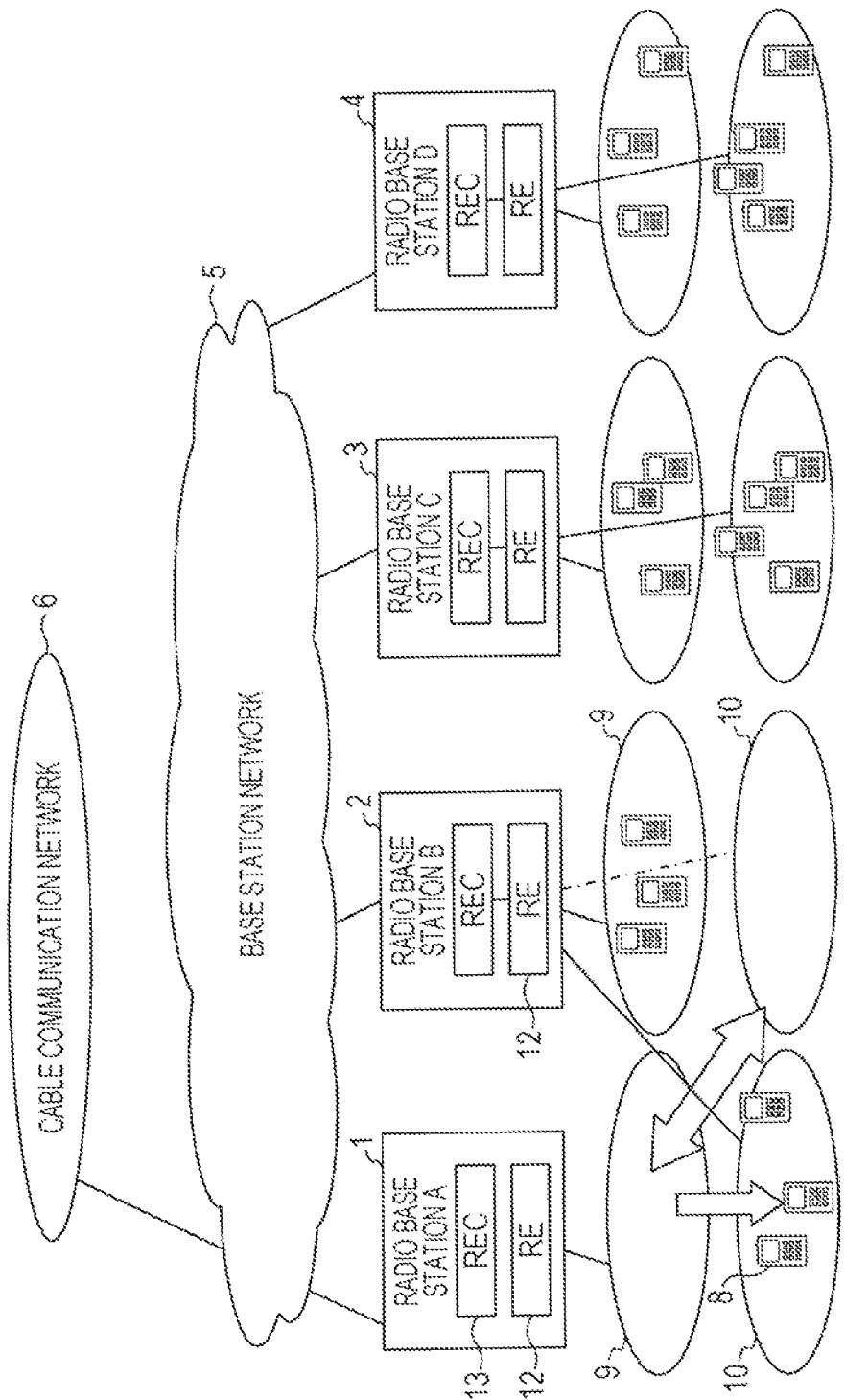
FIG. 3 illustrates an example of a relayed communication path functionality state when a wireless communication system according to an embodiment discontinues service.

FIG. 3 illustrates an example of a relayed communication path state when the wireless communication system according to the embodiment discontinues service. As illustrated in FIG. 3, the connection between the radio equipment 12 and the radio equipment controller 13 or the connection between the radio base station A1 and the base station network 5 may be disconnected in the radio base station A1 due to, for example, a disaster or a failure. It is assumed that the radio equipment 12 of the radio base station A1 is in a normal operating state. In this case, service to the cells 9 and 10 of the radio base station A1 has been discontinued.

Radio base station B2 adjacent to radio base station A1 may use, for example, the carrier wave of the second carrier frequency for wireless communication with the radio base station A1 and may establish a wireless connection between the radio equipment 12 of the radio base station B2 and the radio equipment 12 of the radio base station A1. Therefore, the cell 10 of the radio base station A1 may behave as the cell 10 which uses the carrier wave of the second carrier frequency of the radio base station B2. That is, the radio base station A1 relays a radio wave between the radio base station B2 and the mobile terminal 8 located within the cell 10 of the radio base station A1 by operating as a repeater. Therefore, according to the radio base station and the wireless communication system illustrated in FIGS. 1 to 3, the cell of the radio base station A1 to which service is to be discontinued due to, for example, by a disaster or a failure, may receive a relayed communication path functionality.

Another Example of Base Station Apparatus

Figure 4:
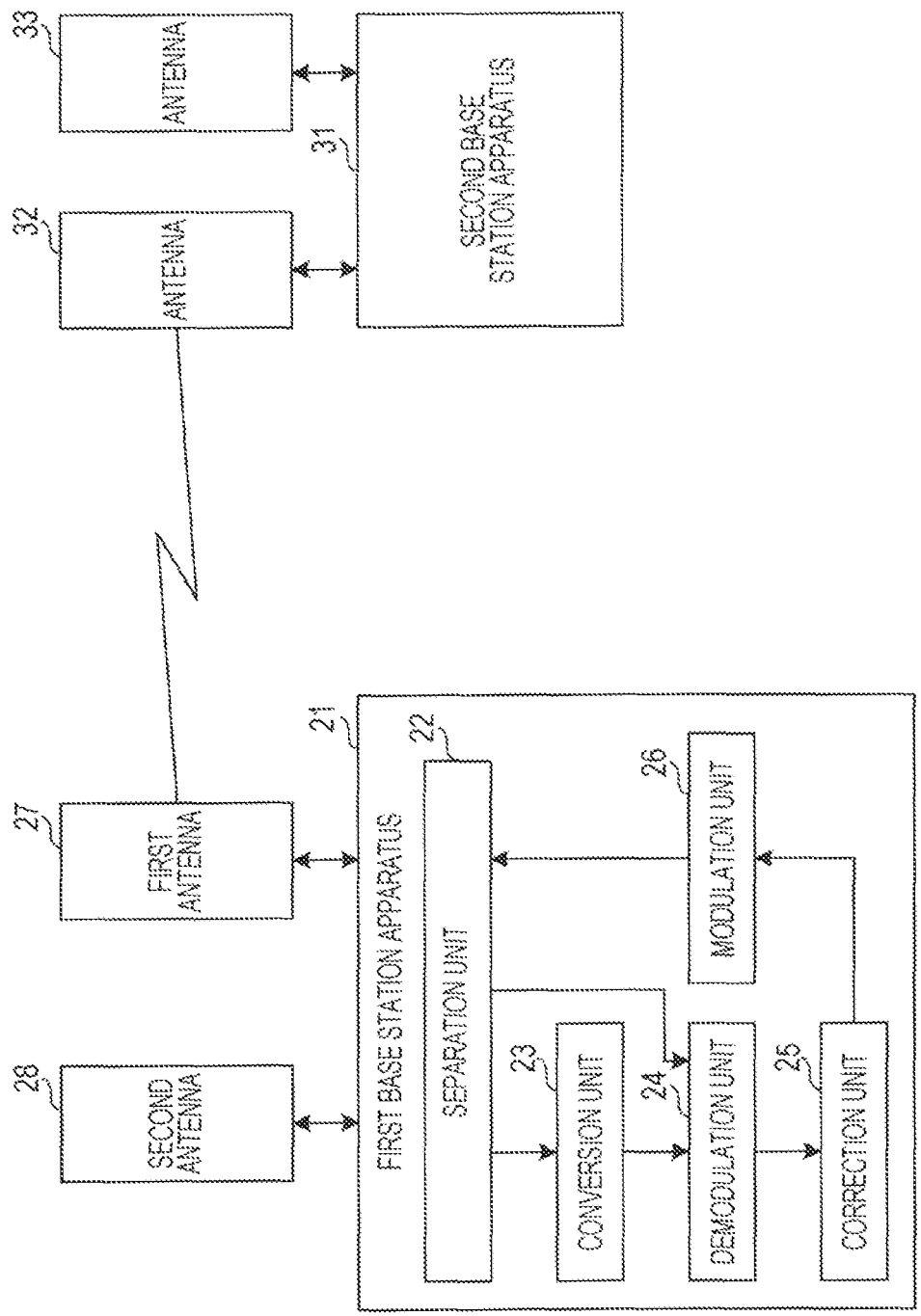
FIG. 4 illustrates another example of a base station apparatus provided in a base station according to an embodiment.

FIG. 4 illustrates another example of a base station apparatus provided at the base station according to an embodiment. As illustrated in FIG. 4, a first base station apparatus 21 comprises a separation unit 22, a conversion unit 23, a demodulation unit 24, a correction unit 25, and a modulation unit 26. The separation unit 22, the conversion unit 23, the demodulation unit 24, the correction unit 22, and the modulation unit 26, among other elements, may be included in the radio equipment. When the separation unit 22, the conversion unit 23, the demodulation unit 24, the correction unit 25, and the modulation unit 26, among other elements, are included in the radio equipment, the REC may be omitted in the first base station apparatus 21 illustrated in FIG. 4.

A first antenna 27 and a second antenna 28, for example, may be connected to the first base station apparatus 21. When the first base station apparatus 21 provides normal service, directivities of the first antenna 27 and the second antenna 28 are changed toward a cell of the base station which includes the first base station apparatus 21. The first base station apparatus 21 causes directivity of the first antenna 27 to be changed toward a cell of adjacent base station when service of the first base station is discontinued. The first base station apparatus 21 receives, by the first antenna 27, a signal of the first frequency transmitted by the adjacent base station. A second base station apparatus 31 is provided at the adjacent base station. In the following description, the base station at which the first base station apparatus 21 is provided may be interchangeably referred to as a first base station and the base station at which the second base station apparatus 31 is provided may be referred to as a second base station. The second base station is a base station adjacent the first base station.

Separation unit 22 is connected to the first antenna 27 and to the second antenna 28. The separation unit 22 separates a transmitted signal, which is transmitted by the first antenna 27 or the second antenna 28, from a signal received by the first antenna 27 or by the second antenna 28. During normal operation, the separation unit 22 outputs the signal received by the first antenna 27 or by the second antenna 28 to the demodulation unit 24 and outputs the transmitted signal output from the modulation unit 26 to the first antenna 27 or to the second antenna 28. When the service of the first base station is discontinued, the separation unit 22 separates the received signal of the first frequency, which has been transmitted by the second base station and received by the first antenna 27, from other transmitted signals or received signals, and outputs to the conversion unit 23.

Conversion unit 23 is connected to the separation unit 22. When the service of the first base station is discontinued, the conversion unit 23 converts the received signal of the first frequency output from the separation unit 22 into a signal of the second frequency and outputs the converted signal to the demodulation unit 24. The second frequency may be a frequency of a signal received during normal service of the first base station apparatus 21.

Demodulation unit 24 is connected to the conversion unit 23. The demodulation unit 24 demodulates a signal output from the separation unit 22 or from the conversion unit 23.

Correction unit 25 is connected to the demodulation unit 24. The correction unit 25 corrects a delay of a signal output from demodulation unit 24. When the service of the first base station is discontinued, the correction unit 25 corrects a delay of a signal output from the demodulation unit 24 produced during propagation of the radio wave from the second base station to the first base station and a delay caused during the frequency conversion process.

Modulation unit 26 is connected to the correction unit 25 and to the separation unit 22. The modulation unit 26 modulates a signal output from the correction unit 25, and outputs the modulated signal to the separation unit 22. When the service of the first base station is discontinued, the modulation unit 26 modulates a signal output from the correction unit 25, generates a transmitted signal of a third frequency, and outputs the transmitted signal of the third frequency to the separation unit 22. The third frequency may be a frequency of a transmitted signal which the first base station apparatus 21 transmits toward a cell of the first base station.

The first base station apparatus 21 transmits the transmitted signal of the third frequency which is output from the separation unit 22 to the cell of the first base station from the second antenna 28. The second base station apparatus 31 may be connected to a plurality of antennas 32 and 33. The first base station apparatus 21 may be an example of a base station apparatus provided in the radio base station A1, which is the first base station in the wireless communication system illustrated in, for example, FIG. 3. The second base station apparatus 31 may be an example of a base station apparatus provided in the radio base station B2, which is the second base station in the wireless communication system illustrated in for example FIG. 3. The second base station apparatus 31 may have the same configuration as that of the first base station apparatus 21.

Example of Wireless Communication Method

FIG. 5 illustrates an example of a wireless communication method according to an embodiment. The wireless communication method illustrated in FIG. 5 may be implemented, for example, between the first base station apparatus 21 and the second base station apparatus 31 illustrated in FIG. 4. The following description relates to the case when the wireless communication method illustrated in FIG. 5 is implemented between the first base station apparatus 21 and the second base station apparatus 31 illustrated in FIG. 4.

As illustrated in FIG. 5, when service of the first base station apparatus 21 is discontinued, the wireless communication method illustrated in FIG. 5 is started. At S1, the second base station apparatus 31 sets directivity of the antenna 32 (i.e., some of the plurality of antennas 32 and 33) connected to the second base station apparatus 31 toward the cell of the first base station.

At S2, the second base station apparatus 31 assigns a part of a radio resources used by the second base station apparatus 31 to the wireless communication with the first base station apparatus 21. S2 may be performed in parallel with or before S1.

At S3, the first base station apparatus 21 sets directivity of the first antenna 27 connected to the first base station apparatus 21 toward the cell of the second base station. S3 may be performed in parallel with or before S1 or S2.

At S4, the first base station apparatus 21 receives, by the first antenna 27, a signal of the first frequency transmitted by the second base station. The received signal of the first frequency is separated from the other received signals and transmitted signals by the separation unit 22 and is sent to the conversion unit 23.

The first base station apparatus 21 converts, by the conversion unit 23, the received signal of the first frequency into a signal of the second frequency (step S5). Next, the first base station apparatus 21 demodulates the signal of the second frequency by the demodulation unit 24 (step S6).

At S7, the first base station apparatus 21 corrects a delay of the modulated signal where the delay includes a first delay caused by propagation of the radio wave from the second base station to the first base station and a second delay caused by the frequency conversion process. At S8, the first base station apparatus 21 modulates the corrected signal and generates a signal of a third frequency.

At S9, the first base station apparatus 21 transmits the signal of the third frequency in the direction of a cell of the first base station from the second antenna 28 connected to the first base station apparatus 21.

The first base station apparatus 21 may receive, by the second antenna 28, a signal of a fourth frequency sent from a mobile terminal located within the cell of the first base station. The first base station apparatus 21 may demodulate the received signal of the fourth frequency by the demodulation unit 24 and may correct, by the correction unit 25, a delay which may be produced when the radio wave is propagated from the first base station to the second base station. The first base station apparatus 21 may modulate the corrected signal by the modulation unit 26 and may generate a signal of a fifth frequency. The first base station apparatus 21 may transmit the signal of the fifth frequency to a cell of the second base station from the first antenna 27.

According to aspects of the present invention as illustrated in FIG. 4 or FIG. 5, when the first base station discontinues service due to, for example, a disaster or a failure, a signal transmitted by the second base station apparatus 31 is relayed by radio equipment of first base station apparatus 21, and is sent to the mobile terminal located within the cell of the first base station. With this, the mobile terminal located within the cell of the first base station can receive the service provided by the second base station. Therefore, the cell of the first base station which discontinued the service may receive relayed communication path functionality. The signal transmitted by the mobile terminal located within the cell of the first base station is relayed by the radio equipment of the first base station apparatus 21 and is sent to the second base station apparatus 31. Therefore, the cell of the first base station which discontinued the service may receive relayed communication path functionality.

Another Example of Base Station Apparatus

FIG. 6 illustrates a hardware configuration of another example of a base station apparatus provided at a base station according to an embodiment. As illustrated in FIG. 6, the base station apparatus includes a duplexer 41, a circulator 42, a multiplier 43, and a first switch 44, among other elements. The duplexer 41 and the circulator 42 are examples of separation units. The multiplier 43 is an example of the conversion unit. The first switch 44 is an example of a switch unit.

The duplexer 41 is connected to a first antenna 60 and to a second antenna 61, in the embodiment, the direction in which the base station transmits the signal to the mobile terminal is referred to as a downlink direction and the direction in which the mobile terminal transmits the signal to the base station is referred to as an uplink direction. Carrier waves of different carrier frequencies are used for a downlink signal and an uplink signal. The duplexer 41 separates the downlink signal from the uplink signal in accordance with each carrier frequency.

The circulator 42 is connected to the duplexer 41. The circulator 42 separates the transmitted signal output from the transmitters 53 and 54 of the base station apparatus from the received signal received by the first antenna 60 or by the second antenna 61. The circulator 42, outputs the transmitted signal to the duplexer 41. The circulator 42 outputs the received signal to the multiplier 43.

The multiplier 43 is connected to the circulator 42. The multiplier 43 converts the frequency of the signal sent from the circulator 42. When service of the station of interest is discontinued due to, for example a disaster or a failure and the cell of the station receives relayed communication path functionality from an adjacent base station, the signal transmitted by the adjacent base station is received by the first antenna 60. The signal transmitted by the adjacent base station is a downlink signal for the adjacent base station. The carrier frequency of the downlink signal is the first frequency. Therefore, the signal of the first frequency is included in the signal sent to the multiplier 43 when the cell of the station receives relayed communication path functionality from the adjacent base station. The multiplier 43 converts the carrier frequency of the signal of the first frequency into the second frequency which is the carrier frequency of the uplink signal by multiplying the signal of the fires frequency by, for example, an output signal of an unillustrated local oscillation circuit.

The first switch 44 is connected to the multiplier 43 and to the duplexer 41. The first switch 44 switches between the signal output from the multiplier 43 and the signal output from the duplexer 41, and outputs one of the signals to low noise amplifiers 47 and 48 of the base station apparatus. When the base station apparatus is in its normal operating state and when the station of interest is providing service, the first switch 44 outputs the received signal sent from the duplexer 41 to the low noise amplifiers 47 and 48. When the cell of the station receives relayed communication path functionality from the adjacent base station, the first switch 44 outputs a received signal sent from the multiplier 43 to the low noise amplifier 48 on the side of the first antenna 60. Switching of the first switch 44 may be controlled by, for example, software.

The base station apparatus includes the low noise amplifier 48, an analog-to-digital converter 52 and a receiver 56 which process signal received by the first antenna 60. The base station apparatus includes, among other elements, the low noise amplifier 47, an analog-to-digital converter 51, and a receiver 55, which process the signal received by the second antenna 61. The analog-to-digital converters 51 and 52 and the receivers 55 and 56 are examples of the demodulation unit. In FIG. 6, each of the low noise amplifiers 47 and 48 is denoted by "LNA," each of the analog-to-digital converters 51 and 52 is denoted by "ADC" and each of the receivers 55 and 56 is denoted by "Rx."

The low noise amplifiers 47 and 48 are connected to the first switch 44. The low noise amplifier 48 amplifies the signal received by the first antenna 60. The low noise amplifier 47 amplifies the signal received by the second antenna 61.

The analog-to-digital converter 52 is connected to the low noise amplifier 48. The analog-to-digital converter 52 converts an analog signal output from the low noise amplifier 48 into a digital signal. The analog-to-digital converter 51 is connected to the low noise amplifier 47. The analog-to-digital converter 51 converts an analog signal output from the low noise amplifier 47 into a digital signal.

The receiver 56 is connected to the analog-to-digital converter 52. The receiver 56 demodulates a modulation signal of the digital signal output from the analog-to-digital converter 52. The receiver 55 is connected to the analog-to-digital converter 51. The receiver 55 demodulates a modulation signal of the digital signal output from the analog-to-digital converter 51.

The base station apparatus includes a processing block 57 and a second switch 58. The processing block 57 is an example of a correction unit. The processing block 57 is connected to the receivers 55 and 56. The processing block 57 is connected to a transmission path 59 that meets the CPRI specification as an interface that meets the CPRI specification. The processing block 57 corrects a delay value, regarding the signals output from the receivers 55 and 56 or the signal sent from the transmission path 59 that meets the CPRI specification.

When the cell of the station of interest receives relayed communication path functionality from the adjacent base station, the processing block 57 corrects a delay value of the signals output from the receivers 55 and 56, produced when the radio wave propagates between the adjacent base station and the station. When the cell of the station receives relayed communication path functionality from the adjacent base station the processing block 57 corrects a delay value of the signal output from the receiver 56, produced during signal processing in the base station apparatus. The delay value produced by the frequency conversion process by the multiplier 43 is included in the delay value produced during the signal processing at the base station apparatus. The processing block 57 in advance compensates for a distortion to be produced when the signal transmitted by the first antenna 60 or the second antenna 61 is amplified by the amplifiers 45 and 46 of the base station apparatus.

The second switch 58 switches a signal output from the receivers 55 and 56 and a signal sent from the transmission path 59 that meets the CPRI specification, and inputs one of the signals in the processing block 57. Switching of the second switch 58 may be controlled by, for example, software.

The base station apparatus includes, among other elements, a transmitter 54, a digital-analog converter 50, and an amplifier 46 which process a signal transmitted by the first antenna 60. The base station apparatus includes, among other elements, a transmitter 53, a digital-analog converter 49, and an amplifier 45 which process a signal transmitted by the second antenna 61. The transmitters 53 and 54 and the digital-analog converters 49 and 50 are examples of a modulation unit. In FIG. 6, each of the transmitters 53 and 54 is denoted by "Tx" and each of the digital-analog converters 49 and 50 is denoted by "DAC."

Transmitters 53 and 54 are connected to the processing block 57. The transmitter 54 modulates a signal output from the processing block 57 and transmitted by the first antenna 60. The transmitter 53 modulates a signal output from the processing block 57 and transmitted by the second antenna 61.

The digital-analog converter 50 is connected to the transmitter 54. The digital-analog converter 50 converts a digital signal output from the transmitter 54 into an analog signal. The amplifier 46 is connected to the digital-analog converters 50. The amplifier 46 amplifies an analog signal output from the digital-analog converter 50 and outputs the amplified analog signal to the circulator 42.

The digital-analog converter 49 is connected to the transmitter 53. The digital-analog converter 49 converts a digital signal output from the transmitter 53 into an analog signal. The amplifier 45 is connected to the digital-analog converters 49. The amplifier 45 amplifies an analog signal output from the digital-analog converter 49 and outputs the amplified analog signal to the circulator 42.

The duplexer 41, the circulator 42, the multiplier 43, and the first switch 44 may be included, among other elements, in the radio equipment of the base station apparatus. The low noise amplifiers 47 and 48, the analog-to-digital converters 51 and 52, the receivers 55 and 56, the transmitters 53 and 54, the digital-analog converters 49 and 50, and the amplifiers 45 and 46 may be included, among other elements, in the radio equipment of the base station apparatus. The processing block 57 and the second switch 58 may be included, among other elements, in the radio equipment of the base station apparatus. When these components 41 to 58 are included in the radio equipment, the radio equipment controller may be omitted in, the base station apparatus illustrated in FIG. 6.

FIG. 7 illustrates a functional configuration of another example the base station apparatus provided at the base station according to an embodiment. As illustrated in FIG. 7, the base station apparatus includes, among other elements, the duplexer 41, the circulator 42, a frequency conversion unit 71, a low noise amplifier 72, an IQ conversion unit 73, a delay correction unit 74, a digital distortion correction unit 75, an amplifier 76, and a database 77. The duplexer 41 and the circulator 42 have been described regarding the hardware configuration of the base station apparatus illustrated in FIG. 6.

The multiplier 43 of the base station apparatus illustrated in FIG. 6 is an example of the frequency conversion unit 71. The low noise amplifier 72 represents two low noise amplifiers 47 and 48 of the base station apparatus illustrated in FIG. 6. The amplifier 76 represents two amplifiers 45 and 46 of the base station apparatus illustrated in FIG. 6.

The IQ conversion unit 73 is an example of the modulation unit and the demodulation unit. The IQ conversion unit 73 is implemented by the analog-to-digital converters 51 and 52, the receivers 55 and 56, the transmitters 53 and 54, and the digital-analog converters 49 and 50 of the base station apparatus illustrated in FIG. 6. The IQ conversion unit 73 demodulates a signal output from the low noise amplifier 72. By demodulation, the signal output from the low noise amplifier 72 is separated into an I component baseband signal and a Q component baseband signal.

The I component baseband signal and the Q component baseband signal are sent to a higher-order baseband unit (BBU) via the delay correction unit 74 or an unillustrated transmission path which meets the CPRI specification. The IQ conversion unit 73 modulates a signal output from the digital distortion compensation unit 75 or a signal sent from the higher-order baseband unit via an unillustrated transmission path which meets the CPRI specification.

The delay correction unit 74 is an example of a correction unit. The digital distortion compensation unit 75 is an example of a compensation unit. The delay correction unit 74 and the digital distortion compensation unit 75 are implemented by the processing block 57 of the base station apparatus illustrated in FIG. 6. When the cell of the station of interest receives relayed communication path functionality from the adjacent base station, regarding the signal output from the low noise amplifier 72, the delay correction unit 74 corrects a delay value produced when the radio wave propagates among the adjacent base station and the stations.

When the cell of the station of interest receives relayed communication path functionality from the adjacent base station the delay correction unit 74 corrects a delay value of the signal received by the first antenna 60 and output from the low noise amplifier 72 via the frequency conversion unit 71, the delay value being produced during the signal processing at the base station apparatus. The delay value produced by a frequency conversion process by the frequency conversion unit 71 is included in the delay value produced by the signal processing in the base station apparatus. The digital distortion compensation unit 75 in advance compensates for a distortion to be produced when the signal transmitted by the first antenna 60 or the second antenna 61 is amplified by the amplifier 76.

Information about positional relationships of the adjacent base stations and the station of interest may be recorded in the database 77, for example. Information about the carrier frequency used in the cell of the adjacent base station may also be recorded in the database 77, for example. Information about the delay value produced when the radio wave propagates between the adjacent base station and the station may likewise be recorded in the database 77, for example. Information about whether the station is a target to receive relayed communication path functionality from the adjacent base station may further be recorded in the database 77, for example. Whether the station is a target for receiving relayed communication path functionality from the adjacent base station is determined in accordance with the distance between the cell of the adjacent base station and the station, the directivity of an antenna in the adjacent base station, the directivity of an antenna in the station, and a carrier frequency used in the cell of the adjacent base station.

Information about whether the station of interest is able to provide relayed communication path functionality to the cell of the adjacent base station may be recorded in the database 77. Whether the station is able to provide relayed communication path functionality to the cell of the adjacent base station is determined in accordance with the distance between the cell of the adjacent base station and the station, the directivity of an antenna in the adjacent base station, the directivity of an antenna in the station, and a carrier frequency which the station can use.

The database 77 may be stored in, for example, unillustrated memory in the base station apparatus. Various types of information may be set in the database 77 by a person who installs the base station apparatus at the time of installation of the base station apparatus. Alternatively, at the time of installation of the base station apparatus, the base station apparatus may acquire venous types of information from the high-order apparatus and the information may be set in the database 77.

The duplexer 41, the circulator 42, the frequency conversion unit 71, the low noise amplifier 72, the IQ conversion unit 73, the delay correction unit 74, the digital distortion compensation unit 75, and the amplifier 76 may be included in the radio equipment of the base station apparatus. The database 77 may be included in the radio equipment of the base station apparatus. If these components 41, 42, and 71 to 77 are included in the radio equipment, the radio equipment controller is omitted in the base station apparatus illustrated in FIG. 7.

Another Example of Normal Operating State

FIG. 8 illustrates another example of a normal operating state of a wireless communication system according to an embodiment. In FIG. 8, regarding the first base station 81 of which cell receives relayed communication path functionality from the second base station 84 which is adjacent to the first base station 81, although the cell 82 of the first carrier frequency and the cell 83 of the second carrier frequency are illustrated, the cells 82 and 83 overlap each other and, therefore, substantially the same cell. Regarding the second base station 84 which provides relayed communication path functionality to the cell of the first base station 81, although the cell 85 of the first carrier frequency and the cell 86 of the second carrier frequency are illustrated, the cells 85 and 86 overlap each other and, therefore, substantially the same cell.

The wireless communication system illustrated in FIG. 8 is an example. FIG. 8 illustrates an example in which the first base station 81 and the second base station 84 each includes two transmitting systems and two receiving systems and transmission and reception are carried out using carrier waves of two carrier frequencies.

It is assumed that, as illustrated in FIG. 8, in the normal operating state, the first base station 81 uses, for example, a carrier wave of a frequency Fa included in the first carrier frequency for downlink transmission and uses, for example, a carrier wave of a frequency Fb included in the first carrier frequency for uplink reception. It is further assumed that, in the normal operating state, the first base station 81 uses, for example a carrier wave of a frequency Fc included in the second carrier frequency for downlink transmission and uses, for example, a carrier wave of a frequency Fd included in the second carrier frequency for uplink reception. Fa, Fb, Fc, and Fd are mutually different frequencies.

Similarly, it is assumed that, in the normal operating state, the second base station 84 uses, for example, a carrier wave of a frequency Fa included in the first carrier frequency for downlink transmission and uses, for example, a carrier wave of a frequency Fb included in the first carrier frequency for uplink reception. It is assumed that, in the normal operating state, the second base station 84 uses, for example, a carrier wave of a frequency Fc included in the second carrier frequency for downlink transmission and uses, for example, a carrier wave of a frequency Fd included in the second carrier frequency for uplink reception.

Another Example of Relayed Communication Path Functionality State when Service is Discontinued FIG. 9 illustrates another example of a relayed communication path functionality state when service of a wireless communication system according to an embodiment is discontinued. As illustrated in FIG. 9, in a relayed communication path functionality state when service is discontinued, the second base station 84 may use, for example, the carrier wave of the frequency Fc for the transmission to the first base station 81 and use, for example, a carrier wave of the frequency Fd for reception from the first base station 81. In the relayed communication path functionality state when the service is discontinued, the second base station 84 may use, for example, the carrier wave of the frequency Fa for the transmission to the cell 85 of the station of interest and use, for example, the use carrier wave of the frequency Fb for the uplink reception from the cell 85 of the station.

Alternatively, in a relayed communication path functionality state when service is discontinued, the first base station 81 may use, for example, the carrier wave of the frequency Fc for the reception from the second base station 84 and use, for example, the carrier wave of the frequency Fd for the transmission to the second base station 84. In the relayed communication path functionality state when service is discontinued, the first base station 81 may use, for example, the carrier wave of the frequency Fe included in the second carrier frequency for the transmission to the cell 83 of the station of interest and use, for example, the carrier wave of the frequency Ff included in the second carrier frequency for the uplink reception from the cell 83 of the station. Fc, Fd, Fe, and Ff are mutually different frequencies.

In the wireless communication system illustrated in FIG. 8, when a connection between the radio equipment in the base station apparatus and the baseband unit which is a high-order apparatus of the radio equipment is disconnected, the state of the base station apparatus of the first base station 81 is put in a state waiting for shifting from the normal operating state to the relayed communication path functionality state. The baseband unit is provided in the base station apparatus and processes the baseband signal. Regarding the base station apparatus of the second base station 84, the state is shifted from the normal operating state to the relayed communication path functionality state when the service is discontinued in the cell of the first base station 81 and when it is determined that the cell of the first base station 81 is able to receive relayed communication path functionality, based on the content of the record of the database of the station of interest.

The base station apparatus of each base station may grasp an operation state of the cell of the adjacent base station via a radio network controller (RNC) which is, for example, a higher-order station of the base station and controls each base station. Alternatively, the base station apparatus of each base station may grasp an operation state of the cell of the adjacent base station by the communication among the base stations using lines used in the long term evolution (LTE) system, such as an X2 line.

The radio equipment of the base station apparatus may measure reverse electric power in the transmission path from the duplexer to the antenna. The reverse electric power reflects the size of the input wave input in the transmitting system. The input wave input in the transmitting system includes the reflected wave from the antenna and the transmission wave from the cell of the adjacent base station. For this reason, when the operation of the cell of the adjacent base station is discontinued and the transmission wave from the cell of the adjacent base station is discontinued, the reverse electric power is lowered. Therefore, the radio equipment may grasp the operation state of the cell of the adjacent base station by measuring the reverse electric power.

Method for Determining Service State

When the service to the cell of the station of interest is discontinued, the radio equipment of each base station apparatus determines whether the service stop has been expected or the service stop is due to any abnormalities. The radio equipment may record the state of the service of the station in, for example, the radio equipment in accordance with a service state recording procedure described later. Then in accordance with the content of the record of the service state, the radio equipment may determine a factor of the service stop and may determine whether the operation to receive a relayed communication path functionality from the adjacent base station is to be started on the basis of a service state determining procedure described later.

The radio equipment may determine to receive a relayed communication path functionality from the adjacent base station when the radio equipment itself is normally operable and there is a problem in the connection between the radio equipment and a high-order apparatus of the radio equipment. Examples of the problems in the connection between the radio equipment and the high-order apparatus of the radio equipment include disconnection of communication between the radio equipment and the radio equipment controller, occurrence of a failure of the radio equipment controller, and occurrence of a failure between the radio equipment and the high-order apparatus of the radio equipment.

Example of Service State Recording Procedure

Figure 10:
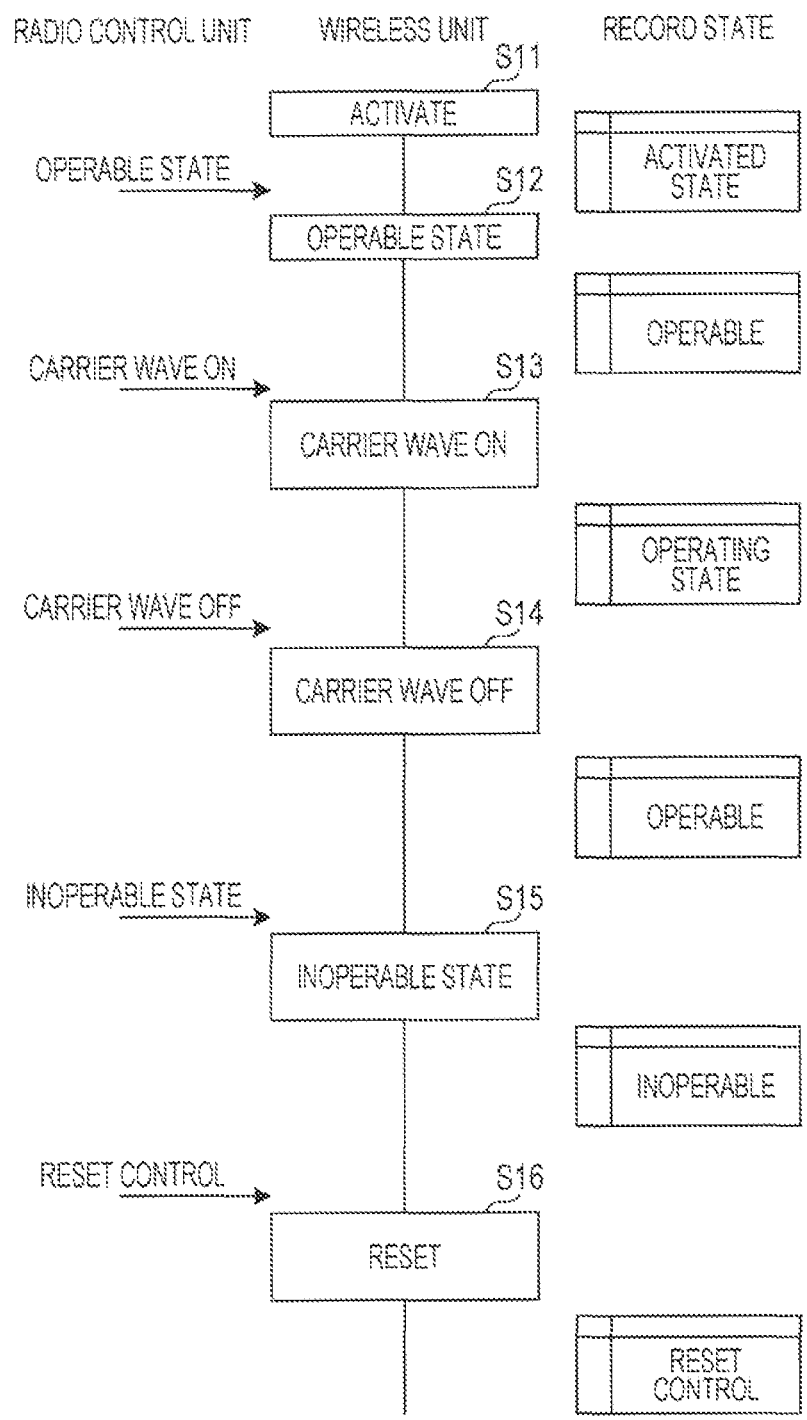
FIG. 10 illustrates an example of a service state recording procedure in a base station apparatus provided at a base station according to an embodiment.

FIG. 10 illustrates an example of the service state recording procedure in the base station apparatus provided at the base station according to an embodiment. As illustrated in FIG. 10, at S11, when the radio equipment is started up, the radio equipment records an "activated state" as a state of the service of the station of interest. When the radio equipment is controlled by the radio equipment controller to be an operable state, the radio equipment at S12 is put into an operable state and "operable" is recorded as a state of the service of the station.

When the radio equipment is controlled to turn the carrier wave ON by the radio equipment controller, at S13, the radio equipment turns the carrier wave ON and records "operating state" as a state of the service of the station of interest. When the radio equipment is controlled to turn the carrier wave OFF by the radio equipment controller, at S14, the radio equipment turns the carrier wave OFF and records "operable" as a state of the service of the station. An example case in which the carrier wave is controlled to torn OFF includes a case in which maintenance and check of the base station apparatus are carried out.

When the radio equipment is controlled by the radio equipment controller to be an inoperable state, at S15, the radio equipment is put into an inoperable state and "inoperable" is recorded as a state of the service of the station of interest. When the radio equipment is controlled by the radio equipment controller to reset the radio equipment, at S16, the radio equipment is reset and "reset control" is recorded as a state of the service of the station. Note that the procedure illustrated in FIG. 10 is merely a list of possible states of the radio equipment and, therefore, the state of the radio equipment does not typically shift in the order illustrated in FIG. 10. That is, the order of S12 to S16 is not limited.

Example of Service State Determining Procedure at the Time of Resumption

Figure 11:
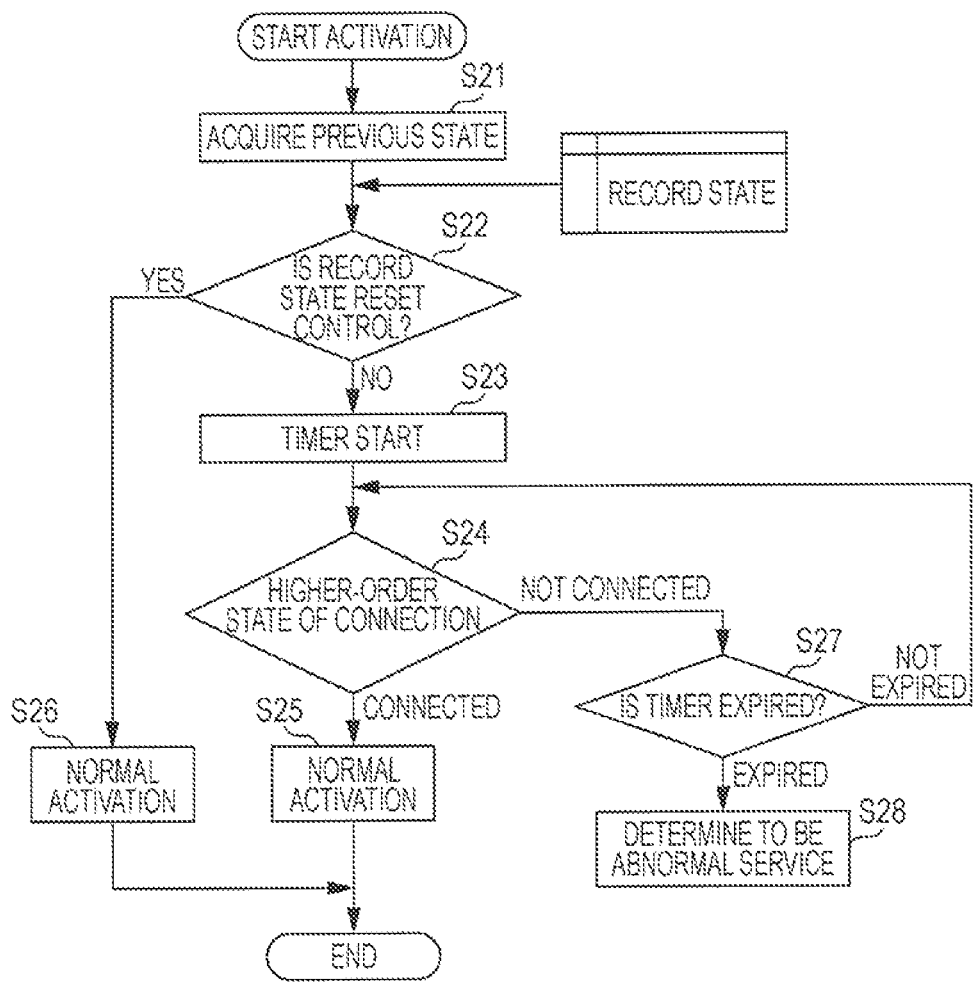
FIG. 11 illustrates an example of a service state determining procedure at the time of resumption of a base station apparatus provided at a base station according to an embodiment.

FIG. 11, illustrates an example of the service state determining procedure at the time of resumption in the base station apparatus provided at the base station according to an embodiment. As illustrated in FIG. 11, at S21, when the radio equipment is started up, the radio equipment acquires a record of the previous service state recorded, for example, in accordance with an example of the service state recording procedure. At S22, the radio equipment determines whether the record of the previous service state is "reset control."

When the record of the previous service state is "reset control," at S26, the radio equipment starts up in the normal operating state. Thus, the radio equipment is put in a state waiting for a connection with the high-order apparatus, and the process is completed. When the record of the previous service state is not "reset control,", at S23, the radio equipment starts a timer up and starts measurement of the elapsed time. The timer may be built in the radio equipment.

At S24, the radio equipment determines a state of connection between the radio equipment and the high-order apparatus. When the radio equipment is connected to the baseband unit which is the high-order apparatus and the base station apparatus is connected to the higher-order station, such as a radio network controller, at S25, the radio equipment starts up in the normal operating state and the process is completed.

When the radio equipment is not connected to the baseband unit which is the high-order apparatus or when the base station apparatus is not connected to the higher-order station, such as a radio network controller, at S27, the radio equipment determines whether the timer has been expired. When timer does not expire, it returns to step S24 and radio equipment determines state of connection with high-order apparatus. When the timer has expired, at S28, the radio equipment determines that the service state is abnormal and starts an operation to receive a relayed communication path functionality from an adjacent base station. An operation to receive a relayed communication path functionality from an adjacent base station will be described later.

Example of Service State Determining Procedure in Operation

Figure 12:
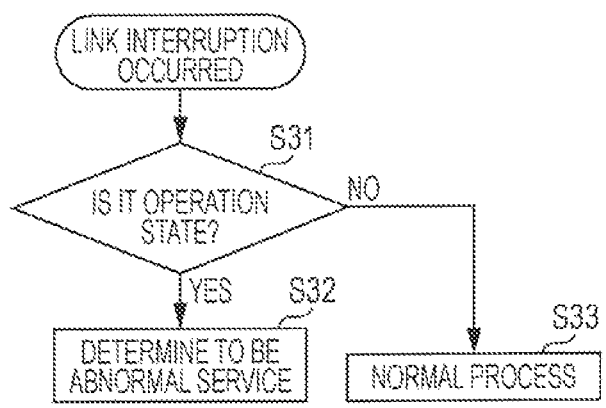
FIG. 12 illustrates an example of a service state determining procedure when the base station apparatus is operating at a base station according to an embodiment.

FIG. 12 illustrates an example of a service state determining procedure when the base station apparatus provided at a base station according to an embodiment is being operated. As illustrated in FIG. 12, when link interruption occurs during operation of the base station apparatus, at S31, the radio equipment determines whether the current state is an operation state. when the current state is the operation state, at S32, the radio equipment determines that the service state is abnormal and starts an operation to receive a relayed communication path functionality from an adjacent base station described later. When the current state is not the operation state, at S33, the radio equipment starts up in the normal operating state and the radio equipment is put in a state waiting for a connection with the high-order apparatus.

As an example of the wireless communication system, as illustrated, for example, in FIG. 8, the first base station 81 which is to receive relayed communication path functionality and the second base station 84 which is to provide relayed communication path functionality each include two antennas, two transmitting systems and two receiving systems, and carry out transmission and reception using carrier waves of two carrier frequencies. In this wireless communication system, the second base station 84 may switch directivity of one antenna from the cell of the second base station toward the cell of the first base station 81 and shift the carrier wave of the second carrier frequency from that used for the communication with a mobile terminal located within the cell of the second base station to that used for the communication with the first base station 81.

The second base station 84 may change the directivity of the other antenna toward the cell of the second base station and use the carrier wave of the first carrier frequency for the communication with a mobile terminal located within the cell of the second base station. The first base station 81 may switch the directivity of one antenna from the cell of the first station toward the cell of the second base station 84. The first base station 81 may change the directivity of the other antenna toward the cell of the first base station and use another carrier wave of the second frequency, which has a different frequency from that of the carrier wave used for the communication with the second base station 84 to perform communication with a mobile terminal located within the cell of the first base station.

As an example of the wireless communication system, the first base station 81 and the second base station 84 each include two antennas, two transmitting systems and two receiving systems, and carry out transmission and reception using carrier waves of four carrier frequencies. In this wireless communication system, the second base station 84 may switch directivity of one antenna from the cell of the second base station toward the cell of the first base station 81 and shift the carrier wave of the third carrier frequency and the carrier wave of the fourth carrier frequency from the communication with a mobile terminal located within the cell of the second base station to the communication with the first base station 81.

The second base station 84 may change the directivity of the other antenna toward the cell of the first base station and use the carrier wave of the first carrier frequency and the carrier wave of the second carrier frequency for the communication with a mobile terminal located within the cell of the second base station. The first base station 81 may switch the directivity of one antenna from the cell of the first base station toward the cell of the second base station 84. The first base station 81 may change the directivity of the other antenna toward the cell of the first base station and use, for the communication with a mobile terminal located within the cell of the first base station, a carrier wave of a frequency which is different from the frequency of the carrier wave for the communication with the second base station 84 among the carrier wave of the third carrier frequency and the carrier wave of the fourth carrier frequency.

As an example of the wireless communication system, the first base station 81 and the second base station 84 each include two antennas, two transmitting systems and two receiving systems, and carry out transmission and reception using a carrier wave of one carrier frequency. In this wireless communication system, the second base station 84 may switch directivity of one antenna from the cell of the second base station toward the cell of the first base station 81 and shift a part of bandwidth of the carrier wave from the communication with a mobile terminal located within the cell of the second base station to the communication with the first base station 81.

The second base station 84 may change the directivity of the other antenna toward the cell of the second base station and use another part of bandwidth of the carrier wave for the communication with a mobile terminal located within the cell of the second base station. The first base station 81 may switch, the directivity of one antenna from the cell of the first base station toward the cell of the second base station 84. The first base station 81 may change the directivity of the other antenna toward the cell of the first base station and use a carrier wave of a bandwidth which is different from the bandwidth for the communication with the second base station 84, for the communication with a mobile terminal located within the cell of the first base station. For example, when the bandwidth of the carrier frequency is 20 MHz, a bandwidth of 10 MHz may be used for the communication between the first base station 81 and the second base station 84.

Example of Operation to Receive Relayed Communication Path Functionality from Adjacent Base Station FIG. 13 illustrates an example of an operation of the radio equipment on the side to receive a relayed communication path functionality from the adjacent base station in the wireless communication system according to an embodiment. In the embodiment, as illustrated in FIGS. 8 and 9, a case in which the base station on the side to receive relayed communication path functionality includes two antennas, two transmitting systems and two receiving systems, and transmission and reception are carried out using carrier waves of two carrier frequencies will be described as an example.

As illustrated in FIG. 13, when the service of the station of interest is discontinued, the radio equipment that is to receive the relayed communication path functionality determines, at S41, in accordance with the service state determining procedure illustrated in, for example, FIG. 11 or FIG. 12, whether the cell of the station is able to receive relayed communication path functionality and such functionality is desired. When the cell of the station is not able to receive relayed communication path functionality or relayed communication path functionality is not desired (No in S41), the radio equipment terminates the process without any other operation.

When the cell of the station of interest is able to receive relayed communication path functionality and such functionality is desired (Yes in S41), at S42, for example, the antenna control device provided in the base station apparatus controls the directivity of the first antenna to be changed toward the cell of the adjacent base station. Therefore, the radio equipment is able to receive, by the first antenna, the transmission wave of the adjacent base station.

At S43, the radio equipment tunes the carrier frequency in the frequency Fc (refer to FIG. 9) included in the second carrier frequency of the adjacent base station on the basis of the recorded content of the database and sets the circulator and the multiplier. In this state, When there is no received signal at S44, the process returns to S42 and control of the directivity of the first antenna and setting of the carrier frequency, the circulator and the multiplier are repeated When there is a received signal at S44, for example, at S45, the antenna control device changes the directivity of the first antenna toward the cell of the adjacent base station and sets the directivity of the second antenna to be the directivity during the normal operation, i.e., the directivity for the cell of the station of interest. At S46, the radio equipment converts the received wave of the carrier frequency Fc (refer to FIG. 9) from the first antenna into a digital signal and then demodulates the converted sign into an I component baseband signal and a Q component baseband signal.

At S47, the radio equipment corrects a delay value, compensates for distortion of an I component baseband signal and a Q component baseband signal, and transmits the signals as a transmission wave of the carrier frequency Fe (refer to FIG. 9) from the second antenna. At S48, the radio equipment converts the received wave of the carrier frequency Ff (refer to FIG. 9) from the second antenna into a digital signal and than demodulates the signal into an I component baseband signal and a Q component baseband signal.

At S49, the radio equipment corrects a delay value, compensates for distortion of an I component baseband signal and a Q component baseband signal, and transmits the signals as a transmission wave of the carrier frequency Fd (refer to FIG. 9) from, the first antenna. Then the radio equipment terminates a series of operation. In the exemplary operation of FIG. 13, the order of S46 and S47 may be switched, and the order of S48 and S49 may be switched.

In the exemplary operation of FIG. 13, although S46 and S47 are illustrated once, they are performed whenever the radio equipment receives the wave of the carrier frequency Fc (refer to FIG. 9) from the first antenna. Similarly, in the exemplary operation of FIG. 13, although S48 and S49 are illustrated once, they are performed whenever the radio equipment receives the received wave of the carrier frequency Ff (refer to FIG. 9 from the second antenna.

Example of Operation to Provide Relayed Communication Path Functionality to Cell of Adjacent Base Station FIG. 14 illustrates an example of an operation of the radio equipment on the side to provide relayed communication path functionality to a cell of the adjacent base station in the wireless communication system according to an embodiment. In the embodiment, as illustrated in FIGS. 8 and 9, a case in which the base station that provides relayed communication path functionality includes two antennas, two transmitting systems and two receiving systems, and transmission and reception are carried out using carrier waves of two carrier frequencies will be described as an example.

As illustrated in FIG. 14, when it is recognized that service is discontinued in the cell of the adjacent base station, at S51, the base station that provides relayed communication path functionality determines whether the relayed communication path functionality is applicable to the cell in which service is discontinued, in accordance with the recorded content of the database. When the relayed communication path functionality is not applicable to the cell in which service is discontinued (No in S51), the radio equipment terminates the process without any other operation.

When the relayed communication path functionality is not applicable to the cell in which service is discontinued (Yes in S51), at S52, the radio equipment discontinues service provided to the cell of the station of interest by carrying out transmission or reception using the carrier wave of the second carrier frequency. At S53, the radio equipment discontinues the service provided to the cell of the station by carrying out transmission or reception by the second antenna using the carrier wave of the first carrier frequency.

At S54, for example, the antenna control device provided in the base station apparatus changes the directivity of the second antenna toward the cell in which service of the adjacent base station has been discontinued. Thus, the radio equipment can communicate, by the second antenna, with the base station which includes the cell which has discontinued the service.

At S55, the radio equipment uses the carrier wave of the frequency Fc (refer to FIG. 9) included in the second carrier frequency for the transmission and uses the carrier wave of the frequency Fd (refer to FIG. 9) for the reception, and resumes service by the second antenna. At S56, the radio equipment to receive relayed communication path functionality continues the service provided using the carrier wave of the second carrier frequency. The radio equipment completes a series of operations.

According to the base station which includes the base station apparatus illustrated in FIGS. 6 and 7, the wireless communication system illustrated in FIGS. 8 and 9, or the wireless communication method illustrated in FIGS. 10 to 14, when the base station discontinues service due to for example, a disaster or a failure, the radio equipment of the base station which discontinued the service operates as a repeater. Therefore, the mobile terminal located within the cell of the base station which discontinued the service is able to receive the service provided by the base station adjacent to the base station which discontinued the service. For example, a mobile terminal located within the cell of the base station which discontinued the service may connect to the base station adjacent to the base station which discontinued the service via the radio equipment of the base station which discontinued the service and, therefore, verbal communication, for example, may be provided. Therefore, the cell of the base station which discontinued service may receive relayed communication path functionality.

According to the base station which includes the base station apparatus illustrated in FIG. 6, since the first switch 44 is included, the propagation path of the received signal in the normal operating state, and the propagation path of the received signal in the state in which the cell of the station of interest is being relieved by the adjacent base station may be switched. Therefore, in the normal operating state, the received signal which does not pass through the multiplier 43 is decoded and, in the state in which the cell of the station is being relieved by the adjacent base station, the received signal of which frequency has been converted by the multiplier 43 is decoded.

According to the base station which includes the base station apparatus illustrated in FIG. 7, a distortion of the signal produced by amplification may be previously compensated for by the digital distortion compensation unit 75 included in the base station apparatus. Therefore, the mobile terminal located within the cell of the base station which discontinued service is able to receive service with less distortion in a signal waveform and thus with high quality.

Each base station apparatus may include three ort yore transmitting systems and three or more receiving systems. Each base station apparatus may include three or more antennas. Each base station apparatus may use one, or three or more carrier frequencies.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should understood that the various changes, substitutions, and alterations could be made hereto without departing from the spirit and scope of the invention.

What is claimed is:

1. A base station comprising:
a separation unit configured to separate a signal to be transmitted by a first antenna or a second antenna, from the signal received by the first antenna or the second antenna;
a conversion unit configured to convert a frequency of a signal output from the separation unit;
a demodulation unit configured to demodulate the signal output from the conversion unit;
a correction unit configured to correct a delay of the signal output from the demodulation unit; and
a modulation unit configured to modulate the signal output from the correction unit, wherein
the base station causes:
the first antenna to change directivity thereof toward a cell of an adjacent base station and to receive a first signal of a first frequency from the adjacent base station;
the conversion unit to convert the first signal of the first frequency into a second signal of a second frequency;
the demodulation unit to demodulate the second signal of the second frequency;
the correction unit to correct a delay in the second signal output from the demodulation unit, the delay including a first delay caused by a propagation of a radio wave from the adjacent base station to the base station and a second delay caused by a frequency conversion performed by the conversion unit;
the modulation unit to modulate the second signal output from the correction unit to a third signal of a third frequency, and to output the third signal of the third frequency to the separation unit; and the second antenna to transmit the third signal of the third frequency to the cell of the base station.

2. The base station of claim 1, wherein the base station further causes:
the second antenna to receive a fourth signal of a fourth frequency from the cell of the base station;
the demodulation unit to demodulate the fourth signal of the fourth frequency;
the correction unit to correct a delay of the fourth signal output from the demodulation unit, the delay being caused during a process of receiving the fourth signal;
the modulation unit to modulate the fourth signal output from the correction unit to a fifth signal of a fifth frequency, and to output the fifth signal of the fifth frequency to the separation unit; and
the first antenna to transmit the fifth signal of the fifth frequency to the cell of the adjacent base station.

3. The base station of claim 2, further comprising:
a switch unit configured to output, to the demodulation unit, one of the second signal output from the conversion unit and the fourth signal received by the second antenna.

4. The base station of claim 1, further comprising:
a compensation unit configured to compensate for distortion of a signal output from the demodulation unit.

5. A wireless communication system comprising:
a first base station apparatus including:
a separation unit configured to separate a signal to be transmitted by a first antenna or a second antenna from the signal received by the first antenna or the second antenna,
a conversion unit configured to convert a frequency of the signal output from the separation unit,
a demodulation unit configured to demodulate the signal output from the conversion unit,
a correction unit configured to correct a delay of the signal output from the demodulation unit, and
a modulation unit configured to modulate the signal output from the correction unit; and
a second base station apparatus included in a second base station having a plurality of antennas and being adjacent to the first base station including the first base station apparatus, wherein,
the second base station apparatus changes directivity of some of the plurality of antennas toward a cell of the first base station and assigns a part of radio resources to wireless communication with the first base station apparatus;
the first base station apparatus causes:
the first antenna to change directivity thereof toward a cell of the second base station and to receive a first signal of a first frequency from the second base station;
the conversion unit to convert the first signal of the first frequency into a second signal of a second frequency;
the demodulation unit to demodulate the second signal of the second frequency;
the correction unit to correct a delay in the second signal output from the demodulation unit, the delay including a first delay caused by a propagation of a radio wave from the second base station to the first base station and a second delay caused by a frequency conversion performed by the conversion unit;
the modulation unit to modulate the second signal output from the correction unit to a third signal of a third frequency, and to output a modulated third signal to the separation unit; and
the second antenna to transmit the third signal of the third frequency to the cell of the first base station.

6. The wireless communication system of claim 5, wherein the first base station apparatus further causes:
the second antenna to receive a fourth signal of a fourth frequency from a cell of the first base station;
the demodulation unit to demodulate the fourth signal of the fourth frequency;
the correction unit to correct a delay of the fourth signal output from the demodulation unit, the delay being caused by a process of receiving the fourth signal;
the modulation unit to modulate the fourth signal output from the correction unit to a fifth signal of a fifth frequency, and to output the fifth signal of the fifth frequency to the separation unit; and
the first antenna to transmit the fifth signal of the fifth frequency to a cell of the second base station.

7. The wireless communication system of claim 6, wherein the first base station apparatus further includes a switch unit configured to output, to the demodulation unit, one of the second signal output from the conversion unit and the fourth signal received by the second antenna.

8. The wireless communication system of claim 5, wherein the first base station apparatus further includes a compensation unit configured to compensate for distortion of a signal output from the demodulation unit.

9. A wireless communication method, comprising:
causing a first base station apparatus:
to change directivity of a first antenna connected to the first base station apparatus in a direction of a cell of a second base station,
to receive a first signal of a first frequency from a second base station apparatus by the first antenna,
to convert the first signal of the first frequency into a second signal of a second frequency,
to demodulate the second signal of the second frequency,
to correct a delay in the second signal, the delay including a first delay caused by a propagation of a radio wave from the second base station to a first base station and a second delay caused by a process of converting the first signal,
to modulate a corrected second signal to a third signal of a third frequency, and
to transmit the third signal of the third frequency toward a cell of the first base station from a second antenna connected to the first base station apparatus; and
causing the second base station apparatus, which is included in the second base station adjacent to the first base station with the first base station apparatus:
to change directivity of some of a plurality of antennas of the second base station apparatus, to a cell of the first base station; and
to assign a part of radio resources to wireless communication with the first base station apparatus.

10. The wireless communication method of claim 9, wherein
the first base station apparatus:
causes the second antenna to receive a fourth signal of a fourth frequency from a cell of the first base station;
demodulates the fourth signal of the fourth frequency;
corrects a delay of a demodulated signal caused by a process of receiving the fourth signal;
modulates the corrected fourth signal to a fifth signal of a fifth frequency; and
causes the first antenna to transmit the fifth signal of the fifth frequency to a cell of the second base station.

11. The wireless communication method of claim 9, wherein
the first base station apparatus modulates the demodulated second signal after compensating for distortion of the demodulated second signal.

\* \* \* \* \*